United States Patent
Kim et al.

(10) Patent No.: US 9,654,844 B2
(45) Date of Patent: May 16, 2017

(54) METHODS AND APPARATUS FOR CONTENT INTERACTION

(71) Applicant: Kiswe Mobile Inc., Bethesda, MD (US)

(72) Inventors: Jeong H. Kim, Potomac, MD (US); Francis X. Zane, New Providence, NJ (US); Thomas J. Janiszewski, Andover, NJ (US); Wim Sweldens, New Providence, NJ (US); Yung-Lung Ho, Bethesda, MD (US); Tom Cuypers, Tongeren (BE)

(73) Assignee: Kiswe Mobile Inc., Bethesda, MD (US)

( * ) Notice: Subject to any disclaimer, the term of this patent is extended or adjusted under 35 U.S.C. 154(b) by 1 day.

(21) Appl. No.: 14/851,942

(22) Filed: Sep. 11, 2015

(65) Prior Publication Data
US 2016/0080830 A1    Mar. 17, 2016

Related U.S. Application Data

(60) Provisional application No. 62/049,682, filed on Sep. 12, 2014.

(51) Int. Cl.
*H04N 7/18* (2006.01)
*H04N 7/173* (2011.01)
(Continued)

(52) U.S. Cl.
CPC ..... *H04N 21/8133* (2013.01); *H04N 21/2187* (2013.01); *H04N 21/21805* (2013.01);
(Continued)

(58) Field of Classification Search
CPC ............... H04N 21/41407; H04N 21/2187
(Continued)

(56) References Cited

U.S. PATENT DOCUMENTS

| 4,592,546 A | 6/1986 | Fascenda et al. |
| 4,722,526 A | 2/1988 | Tovar et al. |

(Continued)

FOREIGN PATENT DOCUMENTS

| EP | 0796541 B1 | 5/1999 |
| WO | 2014036363 A1 | 3/2014 |
| WO | PCT/US2015/049739 | 12/2015 |

OTHER PUBLICATIONS

J. Sánchez et al., "Modeling the Spatial Layout of Images Beyond Spatial Pyramids," available at: http://core.ac.uk/download/pdf/9405801.pdf, Jul. 25, 2012, 28 pages.
(Continued)

*Primary Examiner* — Pankaj Kumar
*Assistant Examiner* — Franklin Andramuno
(74) *Attorney, Agent, or Firm* — Ryan, Mason & Lewis, LLP

(57) ABSTRACT

A method comprises receiving content from at least one source, processing the content to identify an object in the content, assigning an identifier to the object based on the processing, permitting viewer selection of the object identifier, and providing additional information for presentation to a viewer of the content responsive to viewer selection of the object identifier. The content in some embodiments comprises live video from at least one live video source. For example, the content may comprise at least a portion of a panoramic video comprising a combination of multiple live videos from respective ones of a plurality of video sources. The panoramic video may be digitally cropped and scaled before a resulting version of the content is provided for presentation to the viewer. A plurality of different digitally cropped and scaled versions of the content from the panoramic video can be generated and made available to the viewer.

20 Claims, 7 Drawing Sheets

(51) Int. Cl.
| | |
|---|---|
| *H04N 21/81* | (2011.01) |
| *H04N 21/2187* | (2011.01) |
| *H04N 21/2665* | (2011.01) |
| *H04N 21/462* | (2011.01) |
| *H04N 21/218* | (2011.01) |
| *H04N 21/4788* | (2011.01) |
| *H04N 21/234* | (2011.01) |
| *H04N 21/485* | (2011.01) |
| *H04N 21/44* | (2011.01) |
| *H04N 21/8352* | (2011.01) |
| *H04N 21/266* | (2011.01) |
| *H04N 21/414* | (2011.01) |

(52) U.S. Cl.
CPC ... *H04N 21/23418* (2013.01); *H04N 21/2665* (2013.01); *H04N 21/26603* (2013.01); *H04N 21/41407* (2013.01); *H04N 21/44008* (2013.01); *H04N 21/4622* (2013.01); *H04N 21/4788* (2013.01); *H04N 21/4858* (2013.01); *H04N 21/8352* (2013.01); *H04N 21/8193* (2013.01)

(58) Field of Classification Search
USPC .................................................. 725/74, 133
See application file for complete search history.

(56) References Cited

U.S. PATENT DOCUMENTS

| | | | |
|---|---|---|---|
| 5,343,239 | A | 8/1994 | Lappington et al. |
| 5,684,715 | A | 11/1997 | Palmer |
| 5,729,471 | A | 3/1998 | Jain et al. |
| 5,931,908 | A | 8/1999 | Gerba et al. |
| 6,080,063 | A | 6/2000 | Khosla |
| 6,144,375 | A | 11/2000 | Jain et al. |
| 6,193,610 | B1 | 2/2001 | Junkin |
| 6,577,351 | B1 | 6/2003 | Yu et al. |
| 6,758,754 | B1 | 7/2004 | Lavanchy et al. |
| 7,079,176 | B1 | 7/2006 | Freeman et al. |
| 7,448,063 | B2 | 11/2008 | Freeman et al. |
| 8,693,848 | B1* | 4/2014 | Pacor ............... H04N 21/21805 386/296 |
| 8,837,072 | B2 | 9/2014 | Lockton et al. |
| 2001/0040671 | A1* | 11/2001 | Metcalf .................. G09F 19/18 353/94 |
| 2004/0039726 | A1 | 2/2004 | Shimizu et al. |
| 2004/0056879 | A1 | 3/2004 | Erdelyi |
| 2005/0027715 | A1 | 2/2005 | Casey et al. |
| 2005/0060751 | A1 | 3/2005 | Glaser |
| 2006/0187305 | A1 | 8/2006 | Trivedi et al. |
| 2007/0299912 | A1 | 12/2007 | Sharma et al. |
| 2009/0024617 | A1 | 1/2009 | Cope |
| 2009/0046152 | A1 | 2/2009 | Aman |
| 2009/0119729 | A1 | 5/2009 | Periman et al. |
| 2010/0026809 | A1 | 2/2010 | Curry |
| 2010/0088159 | A1 | 4/2010 | Henshaw et al. |
| 2010/0094686 | A1 | 4/2010 | Henshaw et al. |
| 2011/0199372 | A1* | 8/2011 | Porter .................. G06T 7/2046 345/419 |
| 2011/0268320 | A1 | 11/2011 | Huang et al. |
| 2012/0198022 | A1 | 8/2012 | Black et al. |
| 2012/0227074 | A1 | 9/2012 | Hill et al. |
| 2013/0144903 | A1 | 6/2013 | Andrews, II et al. |
| 2013/0300832 | A1 | 11/2013 | Hohteri et al. |
| 2013/0322689 | A1* | 12/2013 | Carmichael ........ G06K 9/00711 382/103 |
| 2014/0101227 | A1 | 4/2014 | Bieselt et al. |
| 2015/0229695 | A1 | 8/2015 | Kim et al. |

OTHER PUBLICATIONS

G. Zoric et al., "Panoramic Video: Design Challenges and Implications for Content Interaction," Proceedings of the 11th European Conference on Interactive TV and Video (EuroITV), Jun. 2013, pp. 153-162, Como, Italy.

J. Ramya et al., "QOE Enhanced Social Live Interactive Streaming," International Journal of Research in Engineering and Technology (IJRET), May 2014, pp. 764-768, vol. 3, No. 5.

Wikipedia, "Interactive Television," https://en.wikipedia.org/wiki/Interactive_television, Sep. 2, 2015, 10 pages.

Y.J. Liang et al., "Low-Latency Streaming of Pre-Encoded Video Using Channel-Adaptive Bitstream Assembly," Proceedings of the IEEE International Conference on Multimedia and Expo (ICME), Aug. 2002, pp. 873-876, vol. 1, Lausanne, Switzerland.

Overlaytv, "Clickable Video at Overlay TV: We Make Video Click," http://www.overlay.tv/, Sep. 4, 2015, 3 pages.

U.S. Appl. No. 14/699,515 filed in the name of Yung-Lung Ho on Apr. 29, 2015 and entitled "Virtual Immersion Via Streamed Content Adaptation.".

* cited by examiner

METHODS AND APPARATUS FOR CONTENT INTERACTION

PRIORITY CLAIM

The present application claims priority to U.S. Provisional Patent Application Ser. No. 62/049,682, filed Sep. 12, 2014 and entitled "Methods and Apparatus for Content Interaction," which is incorporated by reference herein in its entirety.

FIELD

The field relates generally to live video and other types of media content, and more particularly to processing of media content.

BACKGROUND

The rapidly growing use of mobile devices such as laptops, tablets and cellphones has greatly diversified the modes of media consumption. Despite recent advances in this area, a need remains for improved techniques for user interaction with live video and other types of media content.

SUMMARY

Illustrative embodiments of the invention significantly enhance user interaction with live video and other types of media content. By way of example only, this is done in some embodiments by providing a user with a multitude of options to view content in real time as well as archived versions, and to interact and share content and observations with other users via social media. Numerous other combinations of content interaction features can be provided in other embodiments.

In one embodiment, a method comprises receiving content from at least one source, processing the content to identify an object in the content, assigning an identifier to the object based on the processing, permitting viewer selection of the object identifier, and providing additional information for presentation to a viewer of the content responsive to viewer selection of the object identifier.

The content in some embodiments comprises live video from at least one live video source. For example, the content may comprise at least a portion of a panoramic video comprising a combination of multiple live videos from respective ones of a plurality of video sources. The panoramic video may be digitally cropped and scaled before a resulting version of the content is provided for presentation to the viewer.

A plurality of different digitally cropped and scaled versions of the content from the panoramic video can be generated and made available to the viewer.

Other embodiments utilize player identification algorithms to identify and track particular players in video or other content streams. For example, tracked player views can be generated for each of a plurality of players with a given one of the tracked player views being provided for presentation on a given mobile device responsive to selection input received from a corresponding user.

Some embodiments involve separation of background and foreground portions of the video. Such arrangements can be used to facilitate functionality such as player identification and tracking, anti-aliasing and ad insertion.

Numerous alternative arrangements of content processing can be used in other embodiments.

DETAILED DESCRIPTION

Embodiments of the invention will be illustrated herein in conjunction with exemplary content delivery systems that include particular arrangements of networks, devices and other components. It should be understood, however, that embodiments of the invention are more generally applicable to a wide variety of other types of content delivery systems and associated networks, devices or techniques. The term "content" as used herein is intended to be broadly construed so as to encompass, for example, live video or other types of multimedia streams as well as other types of content that are deliverable to devices over one or more networks in a content delivery system.

Embodiments of the invention include but are not limited to methods, apparatus, systems, processing devices, integrated circuits, and computer-readable storage media having computer program code embodied therein.

Some illustrative embodiments described herein advantageously provide an interactive, dynamic experience for an event viewer by providing a unique set of features to enrich the viewing experience, particularly in a mobile environment. For example, these features in the context of a game being viewed as a live event on a mobile device can allow the user to interact with other users via social media, get additional information about the game, players and teams by selecting a player with a finger tap, play a videogame in conjunction with the live event, and even gamble where allowed by law.

Figure 1:
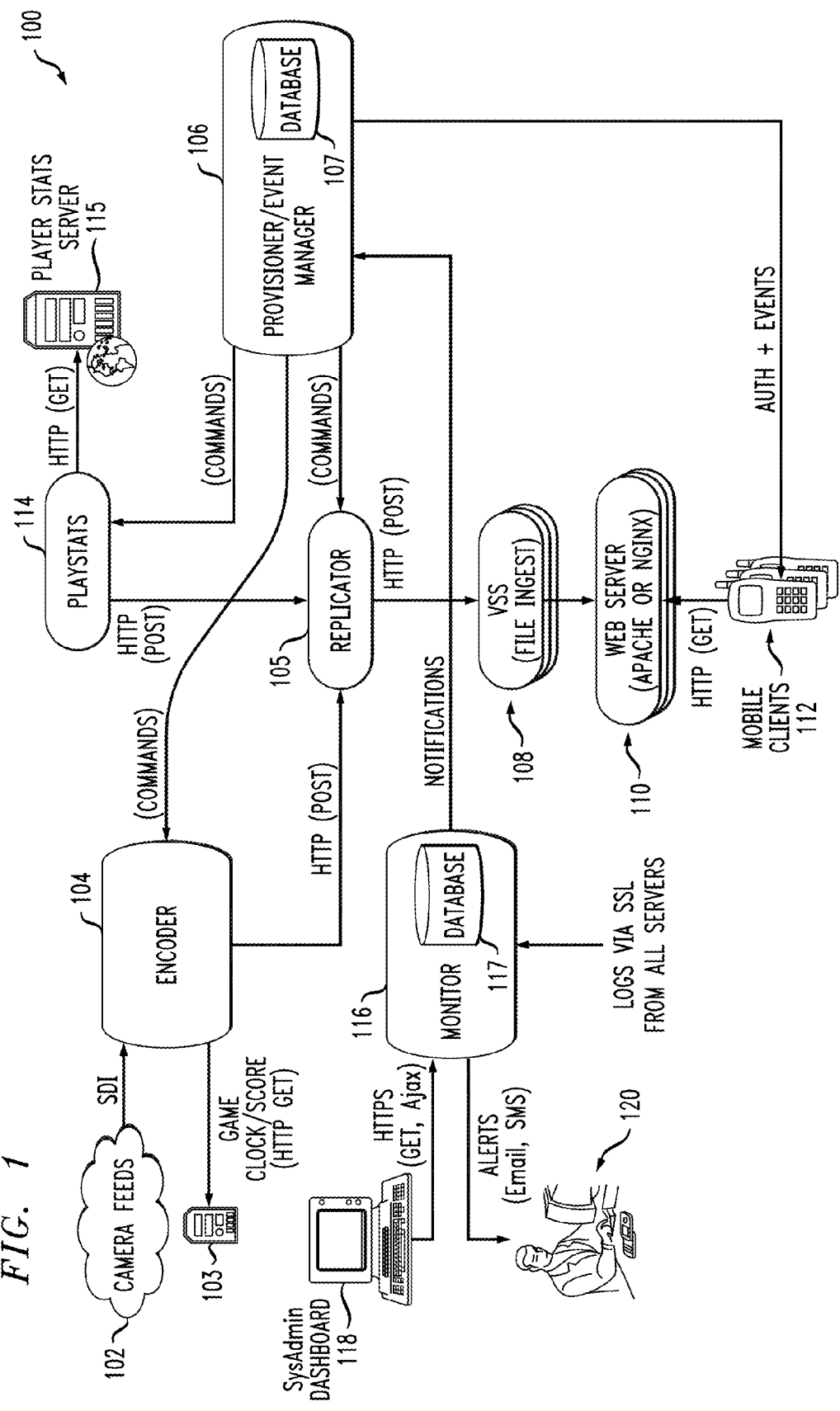
FIG. 1 shows an exemplary content delivery system in an illustrative embodiment.

FIG. 1 shows a content delivery system 100 in one embodiment. In this embodiment, the system comprises software and hardware elements including functions to encode and segment video, distribution methods to make that video or related content available to a user regardless of physical location of the user, and a client application to present the information to the user in a convenient and easy to use format. Users that view content on a mobile device or other type of client device in the system 100 may be viewed as examples of what are more generally referred to herein as "viewers."

The system 100 more particularly includes multiple camera feeds 102. These camera feeds 102 are illustratively associated with respective cameras arranged to capture different views of a game or other live event taking place at a stadium, arena, field, site or other facility providing a venue for the live event. Also associated with the facility is a server 103 that provides game clock and score information, or other types of information associated with the live event. Such information typically includes rapidly-changing metadata associated with the video provided by the camera feeds 102. The camera feeds 102 are also referred to herein as respective "live sources" and other types of live sources can be used in other embodiments.

The camera feeds 102 from respective multiple cameras at the facility are provided to an encoder 104, illustratively via Serial Digital Interface (SDI) connections, although other transport media can be used. A given such camera illustratively provides at least one video signal or other type of video stream comprising a sequence of frames. Such frames comprise respective images, with each such image comprising an array of picture elements or "pixels."

The encoder 104 encodes the video using a video encoding technique such as the H.264 standard, although numerous other video encoding techniques can be used in other embodiments. The encoded video is then segmented in the encoder 104. This illustratively utilizes techniques for streaming of media over the Internet using hypertext transfer protocol (HTTP). For example, the segmenting of encoded video in the encoder 104 may involve use of Apple HTTP Live Streaming (HLS) protocol, Microsoft Smooth Streaming (MSS), or another type of HTTP media streaming protocol. Other embodiments can be configured that involve media streaming without the use of HTTP.

In conjunction with the encoding and segmentation of the video in the encoder 104, the rapidly-changing metadata provided by the server 103 is obtained by the encoder 104. This is achieved using an HTTP GET request as indicated in the figure to obtain the current game clock, score and possibly other information. The HTTP GET request is directed by the encoder 104 to the server 103 as indicated. The obtained information is inserted into or otherwise associated with the video streams generated by the encoder 104 from the camera feeds 102. Such video streams are examples of what are more generally referred to herein as "content streams." Numerous other types of content streams can be used.

The encoder 104 may be implemented as part of a video server. Alternatively, the encoder may comprise multiple video servers. The term "encoder" as used herein is therefore intended to be broadly construed, and illustratively comprises arrangements of encoder/segmenter modules that perform encoding and segmentation of video for respective ones of a plurality of content streams from respective live sources.

The encoding and segmenting of the video in the encoder 104 in some embodiments may be implemented using techniques of the type described in U.S. patent application Ser. No. 14/546,614, filed Nov. 18, 2014 and entitled "Methods and Apparatus for Reducing Latency Shift in Switching between Distinct Content Streams," which is incorporated by reference herein in its entirety. For example, illustrative embodiments of such techniques are configured to generate a plurality of content streams offset from one another in time for each of multiple content streams corresponding to respective live sources. This may involve generating multiple content streams each comprising received content, with each content stream including segments comprising respective portions of the received content, and with different segmenting being utilized in generating respective ones of the content streams such that the segments in each of the content streams are offset in time relative to corresponding segments in the other ones of the streams. Generating the multiple content streams may comprise, for example, separately encoding the received content for each of the content streams and then segmenting the encoded received content using staggered segmentation locations for respective ones of the content streams so as to offset the segments in each of the content streams from the corresponding segments in each of the other content streams. Such an arrangement can be used to reduce latency when switching between content streams. It is to be appreciated, however, that utilization of such techniques is not a requirement of the present embodiment or other embodiments herein.

In an embodiment that generates a plurality of content streams offset from one another in time for each live source, a separate set of encoder/segmenter modules may be provided within encoder 104 for each of the live sources. Additionally or alternatively, multiple instances of the encoder 104 can be implemented within the system 100, for example, with each such encoder providing a set of encoder/segmenter modules for just one of the live sources. Thus, a given implementation of encoder 104 comprising encoder/segmenter modules can illustratively be associated with only one of the live sources. The term "encoder" as used herein is intended to be broadly construed, so as to encompass these and other arrangements of one or more sets of encoders and segmenters.

A given encoder/segmenter module may comprise a serial arrangement of an encoder and a segmenter, although in other embodiments separate modules can be used to implement respective encoding and segmentation functionality. Such modules may comprise, for example, an integrated circuit or a portion of an integrated circuit.

Accordingly, the encoder 104 in some implementations can comprise an image graphics processor or other type of integrated circuit or portion thereof. An image graphics processor of this type can be used to perform image processing operations such as cropping, scaling, stitching, object identification and tracking, background-foreground separation, etc. In some embodiments, an image graphics processor can alternatively be arranged between the camera feeds 102 and the encoder 104. It is therefore possible that an image graphics processor and the encoder 104 can be implemented as separate modules of the system 100.

In some embodiments, the multiple live videos of the camera feeds 102 are combined into a panoramic video. For example, such an arrangement can be achieved by using fixed cameras at the facility to generate respective video signals that are combined into the panoramic video. The generation of the panoramic video from the camera feeds 102 can be implemented prior to encoding in the encoder 104 using a panoramic video signal combiner not explicitly shown in the figure, possibly comprising a component of the above-noted image graphics processor. Other techniques for generating a panoramic video from the multiple live videos of the camera feeds 102 can be used in other embodiments.

The camera feeds 102 in the case of panoramic video illustratively comprise feeds from respective fixed view ultra-high resolution cameras deployed within the facility. Such an arrangement avoids the cost and complexity associated with requiring on-site operators to perform panning and zooming for the respective cameras. Examples of fixed view ultra-high resolution cameras that may be utilized in a given panoramic view embodiment include digital cameras with 8K Full Ultra HD sensors by Red Digital. Such cameras can be used in conjunction with image graphics processing techniques that stitch together the video feeds from the multiple fixed cameras and combine them into a single panoramic view. In such an embodiment, the encoder 104 illustratively comprises or is otherwise associated with an image graphics processor configured to generate the panoramic view from the multiple camera feeds 102.

The resulting panoramic video can be digitally cropped and scaled in different ways to generate multiple distinct versions of the content for presentation to viewers via mobile devices of the system 100. Such an arrangement provides a viewer with additional flexibility in selection of viewing options. For example, a first one of the plurality of different digitally cropped and scaled versions of the content can be presented to a viewer, and then responsive to input from the viewer, a second one of the plurality of different digitally cropped and scaled versions of the content can be presented to the viewer, possibly from a rewind point specified by the viewer. Thus, in some embodiments, a viewer can watch a particular camera view and then rewind with playback from a different camera view.

Accordingly, generating a panoramic view provides the ability to generate a wide variety of different views, such as various player tracking views selectable by a user as described elsewhere herein. Also, the panoramic view can allow generation of replay views from any part of the arena or field, while also simplifying the separation of background and foreground portions of the video. For example, in some embodiments, the background and foreground portions are separated by separating the stationary part of an image sequence, representing the background, from the moving part of the image sequence, representing the foreground. Other background and foreground separation techniques can be used in other embodiments.

Referring again to FIG. 1, the system 100 further comprises a replicator 105, a provisioner/event manager 106 having a database 107, a plurality of video service servers (VSSs) 108, a plurality of web servers 110, and a plurality of mobile devices 112, also referred to as respective "mobile clients."

The encoded and segmented content streams generated from the camera feeds 102 are posted to the replicator 105 using HTTP POST requests as indicated. The replicator 105 distributes the content stream data to the appropriate VSSs 108, again utilizing HTTP POST requests. A given one of the VSSs 108 provides functions that include file ingress and providing support for one or more of the web servers 110. The web servers 110 illustratively comprise Apache or Nginx servers, although a wide variety of other types of servers can be used in other embodiments. Although shown as separate components in the FIG. 1 embodiment, the VSSs 108 and web servers 110 in other embodiments can be combined into server elements that combine the VSS and web server functionality. Such combined server elements in some embodiments can be implemented as distributed web servers, content delivery network (CDN) servers or other types of server elements.

The VSSs 108 and web servers 110 are assumed in the present embodiment to utilize Apple HLS to distribute the content stream data to mobile devices 112. For example, as shown in the figure, a given mobile device 112 can utilize an HTTP GET request generated in accordance with the Apple HLS protocol to obtain particular portions of the content for presentation on that device. The particular number of VSSs 108 and web servers 110 and their respective locations within the system 100 can be determined based on factors such as user loading as well as geographical distribution and redundancy. Such an arrangement advantageously allows the system 100 to scale to a very large number of users.

The provisioner/event manager 106 includes in its database 107 information entered in advance of the live event taking place in the facility and captured by the cameras providing the respective camera feeds 102. Such information includes authorization and event information provided to the mobile devices 112 as well commands provided to the encoder 104 and the replicator 105 regarding the particular manner in which the content from the camera feeds 102 will be processed for the event. The provisioner/event manager 106 also provides commands to a player stats ("playstats") module 114 which is coupled to a corresponding player stats server 115. The player stats module 114 obtains player statistics and other related information from the player stats server 115 using HTTP GET requests as indicated. Such information is delivered by the player stats module 114 to the replicator 105 via HTTP POST requests as indicated. The replicator 105 can combine such information with the content streams received from the encoder 104 for delivery to the VSSs 108 in accordance with the commands provided by the provisioner/event manager 106.

The web servers 110 store sets of video segments and associated index files for the content streams generated from the camera feeds 102. The index files are also referred to as "playlists." A wide variety of different arrangements of index files and associated video segments can be used in a given embodiment.

A client application running on a given one of the mobile devices 112 is configured to query the provisioner/event manager 106 to find events available for the user to view. For example, the user can select a desired event from a list of available events provided to the given mobile device 112 by the provisioner/event manager 106. The client application is then directed to a specific web server 110 associated with a given one of the VSSs 108, from which it retrieves the video data of the appropriate event and camera view based on the user selection. Statistical and historical data may be pulled from the player stats server 115 and other databases of the system 100 in advance or responsive to user requests. For example, the user may select a player and request statistical information such as the season or career three point shot completion percentages for the selected player. Numerous other types of professional or personal information about players can be provided. Such information may be obtained at least in part in advance from the player stats server 115 via the player stats module 114 and delivered to the VSSs 108 and web servers 110 via the replicator 105. Numerous other types of statistical and historical data can be provided to client applications running on the mobile devices 112 in conjunction with presentation of selected content streams.

The system 100 further includes a monitor module 116 having a database 117. The monitor module 116 interacts with a system administration ("SysAdmin") dashboard provided via computer 118 to a system administrator 120. The monitor module 116 receives logs and other information via secure sockets layer (SSL) from all servers of the system 100 and provides alerts via email, SMS or other communications to the system administrator 120. It also processes HTTP GET requests and other requests such as asynchronous JavaScript and XML (AJAX) requests from the dashboard on computer 118. The monitor module 116 is generally configured to monitor the health of the system 100 and permit quick resolution of any issues so as to ensure a reliable customer experience.

Figure 2:
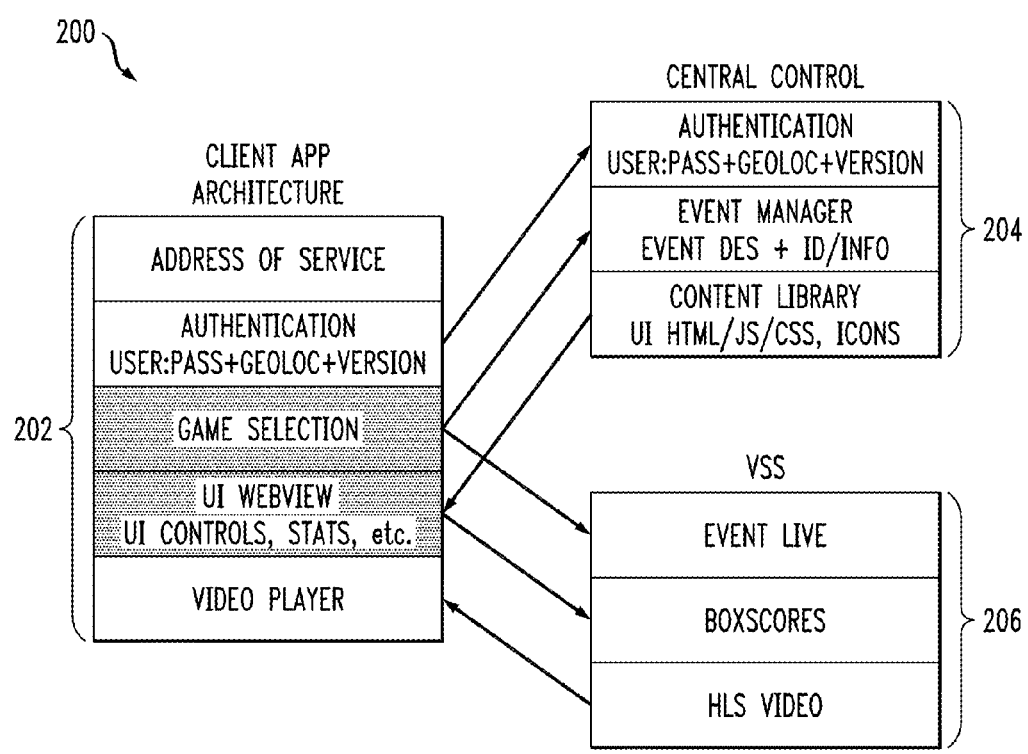
FIG. 2 illustrates a client application architecture and other system component architectures utilized in the content delivery system of FIG. 1.

FIG. 2 shows a more detailed view of certain components of the system 100 in one embodiment. A portion 200 of the system 100 as shown includes a client application having a layered architecture 202, a central control component having layered architecture 204, and a VSS component having a layered architecture 206. The client application is assumed to comprise a client application running on a given one of the mobile devices 112 of system 100 and the VSS component is assumed to comprise a given one of the VSSs 108 and at least a portion of an associated web server 110. The central control component is assumed to comprise the provisioner/event manager 106.

The client application architecture 202 comprises layered elements including an address of service element, an authentication element, a game selection element, a user interface (UI) webview element and a video player element. The client application is assumed to run in an operating system environment of the corresponding mobile device. Such an environment illustratively comprises an iOS or Android operating system, although other operating systems can be supported in other embodiments.

The central control architecture 204 comprises layered elements including an authentication element, an event manager element and a content library element.

The VSS architecture 206 comprises layered elements including an event live element, a boxscores element and an HLS video element.

The authentication element of the client application interacts with the authentication element of the central control component to ensure that a given user is authorized to access the content streams associated with a particular event. This illustratively involves processing authentication information such as a password, geolocation and version, although numerous other types of authentication information can be used. Once a user account has been established with the system, user-specific data can be maintained for that account, including user preferences such as preferred sports, teams, camera view(s), and modes of watching (e.g., user controlled view or director view).

The game selection element of the client application interacts with the event manager element of the central control component. This may utilize information such as event descriptions as well as an identifier (ID) and other information. The game selection element also interacts with the event live element of the VSS component.

The UI webview element of the client application provides various UI controls, including controls for selecting particular camera views or other portions of a content stream, selecting desired player statistics, etc. The UI webview element illustratively interacts with the content library element of the central control component and the boxscores element of the VSS component. Interaction with the content library involves delivery of UI information in formats such as HTML, JS or CSS. Such information can additionally include icon information associated with various UI controls.

The video player element of the client application interacts with the HLS video element of the VSS component.

A given content stream played by the video player element is overlaid with the UI webview in order to allow the user to select available options. The UI webview may be in the form of a browser window within the client application. Various user controls may be implemented using JavaScript running in the UI webview. The game selection element of the client application is additionally implemented using JavaScript. The game selection and UI webview elements are shown as shaded in the figure to indicate their use of JavaScript rather than native code of the operating environment. Native code of the operating environment of the mobile device is utilized in this embodiment for the address of service, authentication and video player elements of the client application.

The interactions between the various elements of the component architectures 202, 204 and 206 are illustrative examples only, and additional or alternative interactions may occur in other embodiments. Moreover, different arrangements of elements can be included in a given component in other embodiments.

As indicated above, embodiments of the invention can include various combinations of viewer interactive features. For example, in order to make the user experience more interactive and dynamic a particular set of features can be implemented. As will become apparent, various combinations of the features disclosed herein can significantly enhance the user experience when watching a sporting event from a mobile device, and in other event viewing contexts. Examples of such features are described in detail below.

These and other features described below are assumed to be implemented in the content delivery system 100 of FIG. 1 but can be implemented in other types of content delivery systems in other embodiments. It should be noted that a given embodiment may comprise only a single one of these features, various subsets of the features, or all of the features. Also, other embodiments can include additional or alternative features that will be apparent to those skilled in the art based on the teachings provided herein.

In some embodiments, users are permitted to select different camera views. This feature supports user selection of multiple video sources representing different camera views or mixed camera views. The different views can be views provided by respective ones of the camera feeds 102. Additionally or alternatively, the different views can be generated by digitally cropping and scaling a panoramic view comprising a combination of multiple live videos from respective ones of the camera feeds 102.

Figure 3A:
FIGS. 3A and 3B illustrate respective initial game view and specific camera view screens of a camera view selection portion of the client application in the FIG. 1 system.
Figure 3B:
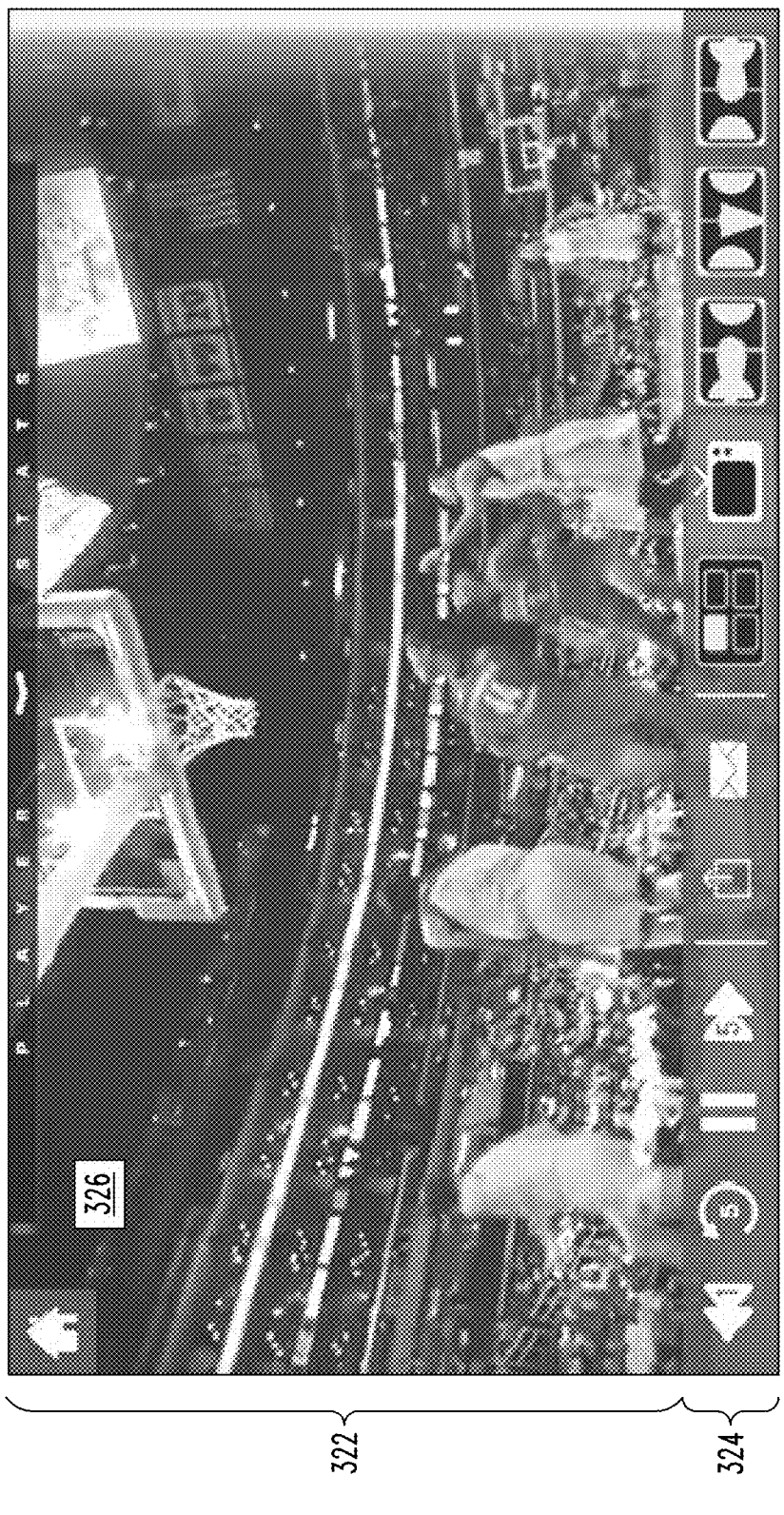

Examples of display screens permitting user selection between multiple views are shown in FIGS. 3A and 3B. These display screens are presented to a user by the client application running on a given one of the mobile devices 112 in the FIG. 1 system. The views in these examples are different views of a live event, namely, a basketball game. The display screens of FIGS. 3A and 3B comprise respective initial game view and specific camera view screens of a camera view selection portion of the client application.

Referring first to FIG. 3A, a display screen 300 comprises a view portion 302 and a control portion 304. The view portion presents multiple selectable camera views including a broadcast view 306 and additional camera views 308, 310, 312, 314 and 316. The broadcast view 306 corresponds to the standard view currently being broadcast from the event, and is also referred to herein as the "broadcast feed." Such a view generally corresponds to the televised view in the case of a televised event, and therefore typically changes between different camera views automatically as the event progresses. The additional camera views 308, 310, 312, 314 and 316 comprise respective close-up, left basket, wide, corner and right basket views, each providing a different camera view of the event.

In this embodiment, the user is initially presented with a choice of multiple camera views and accordingly is permitted to select between the various views 306 through 316. Assuming that the mobile device 112 has a touch-screen interface, a given one of the views is selected by tapping the corresponding camera window of the view portion 302 of the display screen 300. This causes the associated view to be presented as a full screen so as to occupy substantially all of the view portion 302 of the display screen 300. It should be noted that the various views 306 through 316 are presented by way of example only, and numerous alternative arrangements of selectable multiple views can be provided in other embodiments. Other views may include alternative views of the field of play, the sidelines, or the audience, as well as additional views composed out of one or more of the camera feeds, such as a mixed view displaying all feeds in a single feed, or various picture-in-picture combinations.

The user is able to select an initial view to start watching the event. As the event progresses, the user can easily switch views to another available camera depending on the action of play or the desire of the user.

The control portion 304 of the display screen 300 includes various selectable control icons for rewind, replay, fast forward and pause, as well as options to send portions of the video to other users via messaging or email.

FIG. 3B shows an example of a display screen 320 that is presented upon user selection of a particular camera view. The display screen 320 comprises a view portion 322 and a control portion 324. In this case, the selected camera view 326 is presented as a full screen so as to occupy substantially all of the view portion 322 of the display screen 320. The control portion 324 comprises control icons similar to those of the control portion 304 of display screen 300, but further includes additional selectable icons that indicate respective alternative selectable views. For example, a television icon if activated will change the selected camera view to the broadcast feed. Other icons correspond to other camera views that are selectable by the user via the control portion 324 of the display screen 320. Also included is an icon that if activated will take the user to a start screen such as the display screen 300 that shows tiles of all the available views.

As mentioned previously, the system 100 can be configured to reduce latency when switching from one video stream to another using techniques such as those described in the above-cited U.S. patent application Ser. No. 14/546,614.

Additionally or alternatively, the multiple camera views can be generated by digitally cropping and scaling a panoramic view that is formed as a combination of multiple live videos from respective ones of the camera feeds 102.

Figure 6:
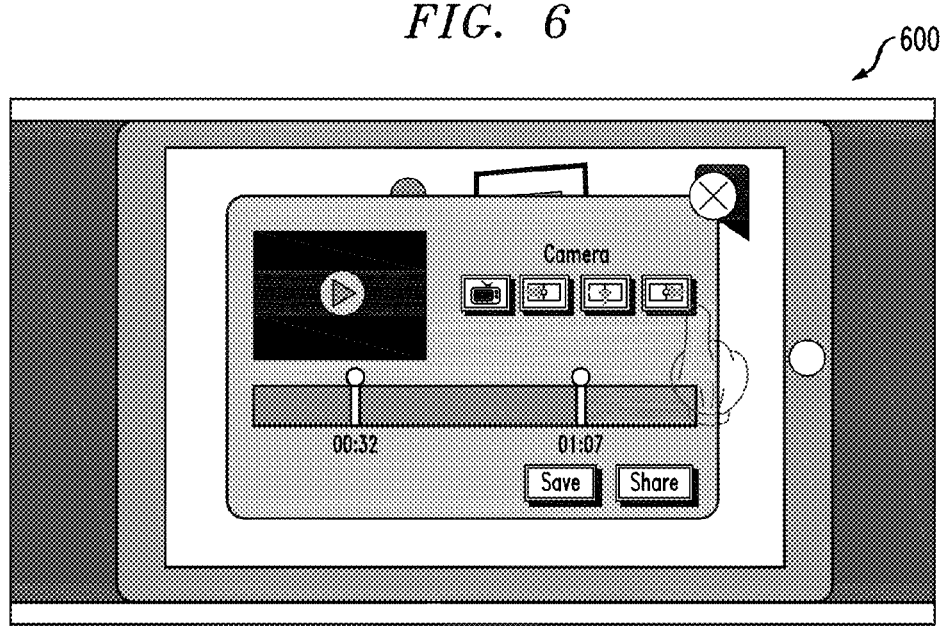
FIG. 6 illustrates selecting start and end times of a video clip.

The control portions 304 and 324 of the display screens of FIGS. 3A and 3B each provide controls associated with a live timeline navigation feature. This feature illustratively provides the user with an ability to go back to any point in a timeline of the game. In these embodiments, the feature is provided using rewind controls that take the user back a preset amount of time. The user can rewind to a particular point in the timeline and play the game from that point and can also return to a real-time view of the game. Another example of timeline navigation controls is shown in FIG. 6. The same or similar controls can be provided for viewing of an archived game or other event as opposed to a live event.

Other implementations of this feature can permit the user to select any point in time and directly navigate to that point in the game. This facilitates the ability to select and save highlights as the user watches the game. For example, the control portion of the display screen could be configured to include a timeline in which the user drags a cursor to the desired point in the game and the video plays from that point. Additionally or alternatively, the control portion could allow the user to directly enter the desired time from the start of the game, based on the game clock or the actual time of the event. The time could be entered in a variety of different formats. For example, the user could enter 1:15 representing the delta time into the game, or 0:15 representing the time clock of the game or 8:15 PM representing the actual clock time. These selections all take the user to the same point in the game.

The particular user interface display screens shown in FIGS. 3A and 3B are presented by way of example only, and numerous alternative screen layouts, control mechanisms and other format characteristics can be used in other embodiments. Other examples of user interface display screens providing other content interaction features will be described below in conjunction with FIGS. 6, 7 and 8.

In some embodiments, a player identification zoom feature is included. This feature allows the user to select a player. Once a player has been selected the user can select display of a camera view that follows the player from that point onward. Additional information can be accessed and presented in conjunction with the camera view of the selected player, such as social media information, statistics or other information associated with that player.

The player identification zoom feature can be implemented by receiving live video content from one or more of the camera feeds 102, processing the content to identify players in the content, assigning player identifiers to respective ones of the players, and permitting viewer selection of a particular one of the player identifiers. Additional information is then presented to the viewer of the content responsive to viewer selection of the player identifier, such as the above-noted social media information or statistics for the player. The player identification zoom feature can include additional process steps, such as inserting player identification information in the content stream so as to support the viewer selection of a particular player identifier. At least portions of the player identification zoom feature, such as the processing of the content to identify players in the content, can be implemented using an image graphics processor or other similar video processing element associated with the encoder 104.

As indicated previously, the additional information may also include a particular camera view associated with the selected player. This camera view illustratively comprises a tracked player view in which a player corresponding to the player identifier is tracked over a plurality of frames and the camera view is cropped and scaled to increase an apparent size of the player in the tracked player view. The tracked player view may be one of the multiple distinct camera views that are generated by digitally cropping and scaling a panoramic view that is formed as a combination of multiple live videos from respective ones of the camera feeds 102. Accordingly, multiple distinct tracked player views can be generated within the system and provided to different users based on user selections.

Such an arrangement illustratively generates a new feed for each player from one or more of the available camera feeds 102 or from a panoramic view based on a combination of those camera feeds. Again, this may involve cropping and scaling the existing view so that the player is larger in the view.

The ability to track a player provides additional opportunities for interactive video, gaming, and auto-directed broadcasting. Such player tracking is simplified in the case of the above-noted panoramic views, which may be generated by combining video feeds from multiple ultra-high resolution fixed view cameras. For example, with such a panoramic view arrangement based on multiple ultra-high resolution fixed view cameras, players tend to stay in the frame while the game is in action, such that once a player is identified and acquired for tracking purposes, it can be tracked without frequent reacquisition.

The generation of a given tracked player view in some embodiments involves obtaining image coordinates for an object in each of a plurality of frames, determining a trajectory for the object over the frames based at least in part on the obtained image coordinates, classifying the object in each of at least a subset of the frames based at least in part on the trajectory, and assigning a player identifier to the classified object. Such a process identifies objects in the video that are likely to be players and performs tracking and classification of such objects over multiple frames until a player identifier can be assigned to the object. It should be noted that such techniques as disclosed herein can be used to track and identify other types of objects in the video, such as a basketball or football. Accordingly, the selectable views in some embodiments can track objects other than players.

In order to obtain image coordinates for the object in a given one of the frames, color blob detection or other types of image processing may be performed. For example, in the case of objects corresponding to players, color blob detection can be performed based at least in part on a known team uniform color of one or more players. Also, training samples for each player on the team can be used to facilitate the determination of the image coordinates of each player within the camera view for each video frame.

As mentioned previously, the objects are identified and tracked over a series of video frames so as to create a trajectory. In order to limit the processing resource requirements associated with such object tracking, some embodiments utilize a less processor-intensive coarse motion tracker (e.g., optical flow) to discover objects but more processor-intensive and also more reliable algorithms (e.g., classifiers+local search) to track the objects. This minimizes resource requirements while still obtaining the desired results.

It was noted above that initial detection of an object can be performed using color blob detection where the blob is determined to be a team color. These objects are tracked through trajectories over time. If there is color blob detection not near an existing object, then a new object is created. All existing tracked objects are then followed to the next frame by combining several inputs, including optical flow clustering (e.g., visual motion), nearby color blob detections, and simple classifiers. This process determines the location in each frame of an object thought to be a player over multiple frames. The data may be in the form of an array in which the entry for a given identified object for a given one of the frames has the following format: (objectID, x, y, frame number), where x and y denote the image coordinates of the object (e.g., denoting a centroid of the object) in the specified frame.

Classification of the object may involve a process such as defining an area of a given one of the frames using the obtained image coordinates for that frame, generating descriptors for the defined area using a dense feature set, applying the descriptors to a Gaussian mixture model to generate Fisher vectors, pooling the descriptors and associated Fisher vectors to form a spatial pyramid, and utilizing the spatial pyramid to classify the object within the given frame as corresponding to the player identifier.

Figure 4:
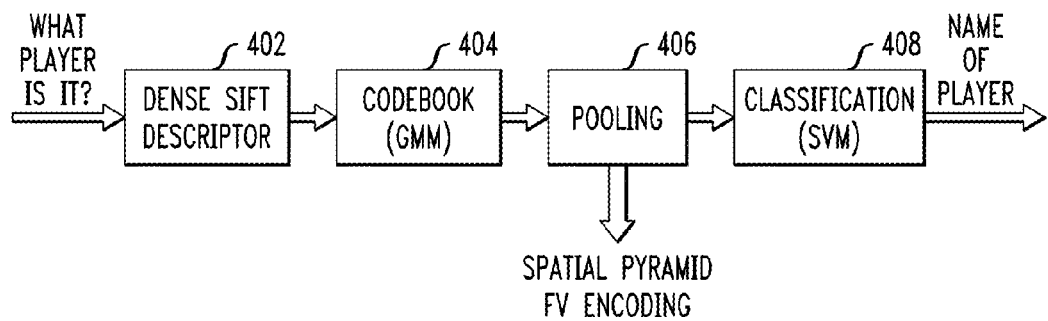
FIG. 4 shows a player identification algorithm chain.

An example of this classification process is illustrated by the player identification algorithm chain 400 of FIG. 4. This algorithm chain includes steps 402, 404, 406 and 408 which process the video using the identified objects, including their image coordinates and trajectories over multiple frames, in order to classify a particular object as corresponding to a particular player identified by name. In this example classification algorithm, objects are matched to players. The image coordinates comprising location (x,y) for each object in a given frame are used to center and define an area of the frame in which the classification algorithm is performed.

In step 402, raw features are created using a dense feature set, illustratively a set of dense SIFT (Scale-Invariant Feature Transform) descriptors. Alternative implementations can utilize similar techniques such as SURF (Speeded Up Robust Features), BRIEF or ORB features. The frame or image is broken down into grids at different scales and the SIFT descriptors are extracted from each one. The outputs of this step are 128-Dimensional SIFT descriptors comprising feature vectors ($I=(x1, \ldots, xN)$).

In step 404, a Gaussian Mixture Model (GMM) is created using features extracted from training images. The GMM is a statistical visual dictionary and it fits the distribution of descriptors and so can be used to describe an image. The GMM is used in the following step to create Fisher vectors.

In step 406, pooling is performed to generate Fisher vectors. The Fisher vectors describe how the distribution of features of a particular image differs from the distribution fitted to the features of all training images. Principal Component Analysis (PCA) is used to reduce the dimension of descriptors and Fisher vectors. Additionally Spatial Pyramid Matching (SPM) is used to determine the location of the descriptors. SPM works by partitioning the image into increasingly fine sub-regions and computing Fisher vectors with the descriptors (e.g., features) found inside each sub-region. The resulting "spatial pyramid" is a simple and computationally efficient extension of an orderless bag-of-features image representation, and it significantly improves classification performance.

In step 408, encoded training images which have labels are used to train one or more SVMs (Support Vector Machines) and learn the models for each class. After learning each SVM model for each class, each image is classified according to these learned SVM models. The one-to-all method is used at this step and confidence scores are calculated for each class.

These steps of the FIG. 4 player identification algorithm chain describe the process of assigning a likelihood of a single object in a single frame being a specific player.

It should be noted that the particular ordering and operations of the steps 402, 404, 406 and 408 is illustrative only, and can be varied in other embodiments. For example, certain steps can be performed at least in part in parallel with one another rather than serially as illustrated in the figure.

From the object tracking, a trajectory is provided which represents a single object that moves in space and time. Since a trajectory represents a single object, it should get a single player label, and each player label should be used at most once in a frame. The player identification algorithm chain is run on the location of the trajectory in each frame, producing a collection of objects of the form of (objectID, frame number, player1 score, player2 score, . . . ). With this information voting can be performed. For example, a single playerID is assigned to the entire objectID trajectory by iterating between two steps:

1. Select a trajectory with a clear playerID, meaning that the same playerID has the highest score for many frames.

2. Assign that playerID to that object, then remove that object and remove that playerID from any other object that overlaps this one in time, thus ensuring that there are not two copies of the same player.

This player identification process results in the unique identification of each player in the video so that the user can select the player and obtain the desired information relating to that player, such as the above-noted tracked player view, or related information such as social media information or player statistics.

An automated player identification process such as that described above can be assisted based on user input. For example, assigning an identifier to an object can involve receiving input from a viewer associating the identified object with a particular player, and assigning a player identifier of the particular player to the identified object based at least in part on the received input. Such an arrangement illustratively provides human-assisted automated tracking, utilizing user input to improve the results of the automated player identification algorithm described previously. If the algorithm is not able to identify the player, the user can provide input for the unidentified player via the user interface. This information can then be updated in a player identification database so that overall identification can be improved and shared with all the viewers. Another scenario is a misidentification of a player which can be corrected with user input. Here the user provides an alternate name for a player that has already been identified. There are many ways that this could be implemented, but a simple example is to wait for a specified number of user inputs that identify the player consistently. Once the specified number is reached, the player identification is updated for all viewers.

Additional or alternative player identification processes can be used in other embodiments. For example, some embodiments are configured to detect a preassigned player indicator on a uniform of a player corresponding to an identified object, and to assign a player identifier to the identified object based at least in part on the detected preassigned player indicator. The video is then processed to substantially remove the preassigned player indicator from the video before providing the video for presentation to a viewer.

Figure 5:
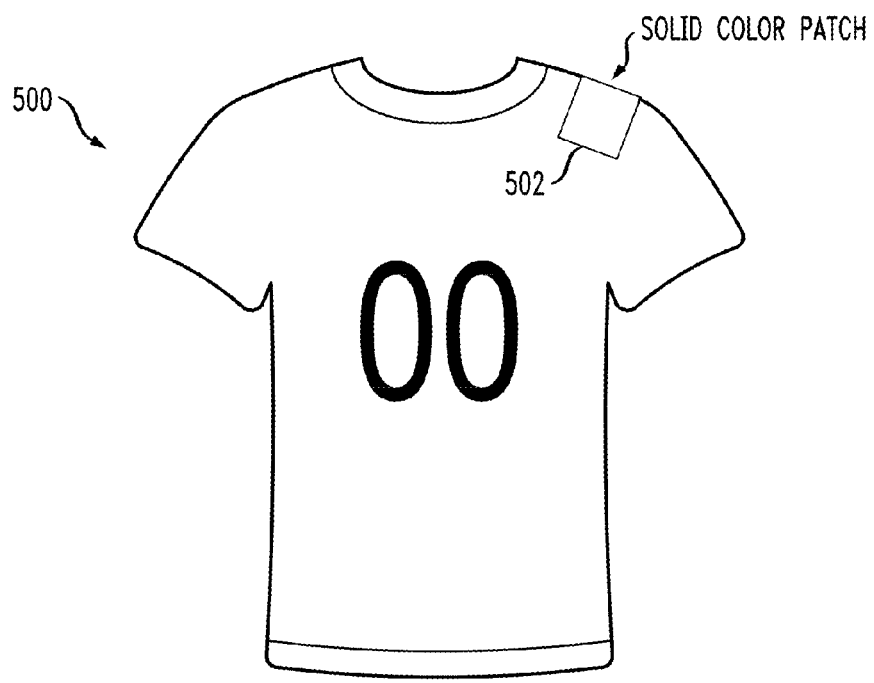
FIG. 5 shows a player uniform having a preassigned player indicator that is detectable through video processing.

The preassigned player indicator in some embodiments comprises a color patch. An example of such an arrangement is illustrated in FIG. 5, which shows a player uniform 500 having a preassigned player indicator in the form of a solid color patch 502 affixed at a shoulder portion of the uniform 500. The solid color patch 502 is detectable through video processing and can also be removed from the video by additional video processing before the video is presented to the viewer.

The use of the solid color patch can facilitate rapid reacquisition of a player for tracking purposes in situations such as those in which a player leaves the field or groups of players are crowded together in a bunch. Moreover, it avoids problems associated with conventional facial recognition or number recognition approaches, which can be error prone and computationally intensive. The solid color patch in the FIG. 5 embodiment is not only computationally simple to identify, but it is also physically robust and moreover is easily removable via digital post-processing by an image graphics processor.

The ability to remove the patch from the video before presenting the video to a viewer is important in that easily recognized features are also distracting by definition, particularly for a home audience that often sees a zoomed-in close-up view of a particular player. This embodiment therefore contemplates that the color patches are digitally removed by replacing the patch colors with the team uniform color before broadcasting the video.

In the FIG. 5 embodiment, the solid color patch 502 extends front and back over the shoulder portion of the uniform so as to be easily seen by a camera regardless of whether the player is facing toward or away from the camera, and to appear similar in both cases. It is assumed in this embodiment that each player wears a different color patch that is also different than the color of the uniform, at least at shoulder level. The placement on the shoulder is also uniquely advantageous as patches on the legs can be confusing as to which leg belongs to which player when the players are closely grouped while mid-body patches may be distracting to the players themselves. Moreover, with shoulder patches, overhead cameras can now be used to help player tracking.

The use of a solid color patch as in the FIG. 5 embodiment also serves to enhance the performance of pattern recognition algorithms that are based on statistical identification of distinct features in video and other content streams. For example, many algorithms can be considerably simplified if color anomalies in the upper bodies are given a higher statistical weight. Accordingly, an advantage of the unique color patch is its compatibility with known identification and tracking software. In fact, it is possible to achieve nearly 100% recognition success using the solid color patch arrangement.

As noted above, another advantage of the color patch is the ease of post-processing removal. Such removal can be further simplified by separating background and foreground portions of the video. For example, standard color replacement image processing techniques can be used to overwrite the shoulder patch colors with the team jersey color where they occur in the foreground. The exclusion of the background from the process avoids interference from color logos on the arena floor. A further enhancement of the technique is to perform the color replacement only on the shoulder area. The color patch need only be distinct from the other colors in the upper portion of the uniform, such that the lower portion of the uniform can be designed with greater color flexibility.

Other color patch arrangements are possible. For example, patches of the same color may be placed on each shoulder of a given player uniform. Also, it is possible to utilize various unique patterns in place of solid colors, although such alternative arrangements could make the pattern recognition process more complicated.

As mentioned above, generation of a panoramic view in some embodiments facilitates the separation of background and foreground portions of the video. This separation of background and foreground portions can also facilitate player identification and tracking using techniques such as the solid color patches described above. The players are generally considered part of the foreground and are more easily tracked if the foreground is separated from the background through video processing.

In addition, the ability to separate the background from the foreground comprising the players adds commercial value as it allows simple digital post-processing replacement of arena or field logos. For example, tailored digital advertisements can be inserted into the background depending on audience demographics. With fixed field of view video, the background can be most simply separated by capturing an image of the arena or field while it is empty. Anything that moves after the game has started is considered foreground. Alternatively, an image graphics processor can compare captured frames over a period of time to identify the non-moving elements. These and other techniques for separating background and foreground portions, possibly based on color or pattern selectivity, are all simplified with a static field of view, such as that provided by the stationary fixed view ultra-high resolution cameras used to generate a panoramic view in some embodiments.

An issue that arises in embodiments that generate a panoramic view by combining video from multiple stationary or fixed view ultra-high resolution cameras relates to aliasing of lines in the resulting video, such as lines on a court or a field. For example, straight slanted lines appear to have a staircase effect. Aliasing does not affect mechanical pan and zoom video cameras because camera movement blurs the lines just enough to anti-alias them. Simply applying traditional anti-aliasing techniques to the unseparated video is not optimal as some blurring of the entire image is inevitable even though the players on field do not need anti-aliasing as they move and have few straight-line features.

The separation of background and foreground portions of the video can be used to facilitate anti-aliasing in some embodiments. This may involve a process including the steps of identifying players in the video, separating the video into a first portion comprising image portions associated with the players and a second portion comprising image portions associated with background, applying an anti-aliasing process to the second portion, and recombining the first and second portions. The recombined first and second portions are then presented to a viewer. It is also possible to alter one or more advertisements of the first portion prior to recombining the first and second portions.

Such an approach illustratively applies anti-aliasing only to those pixels of a video frame that are identified as background. However, as this may make the foreground players stand out unnaturally (e.g., have a "pasted-on" look), the process adds an additional step of filtering the boundary between background and foreground to soften the transition. In practice, this may be implemented using spatial filtering to blend the background and foreground pixels just at the borders or edges between background and foreground.

A more detailed example of one possible set of filters that may be used in a given embodiment will now be described with reference to TABLES 1 and 2 below.

TABLE 1 illustrates the weight factors of a 3×3 Gaussian blur filter used for anti-aliasing of the background portion of the video. With Gaussian filtering, the value of a given pixel in its color space (e.g., Red-Green-Blue, Hue-Saturation-Luminance, Luma-Chrominance), is replaced by a weighted average of that value and corresponding values of its neighboring pixels. The entries in TABLE 1 below show the relative weight factors of 3×3 Gaussian blur filter applied to each background pixel.

TABLE 1

A 3 × 3 Gaussian filter kernel used for background anti-aliasing

| $1/18$ | $1/9$ | $1/18$ |
| $1/9$ | $1/3$ | $1/9$ |
| $1/18$ | $1/9$ | $1/18$ |

Using this example filter, the value of a given pixel will be replaced with a value that is $1/3$ of the value for the given pixel, plus $1/9$ of the values of its horizontal and vertical neighbors, and $1/18$ of the values of its diagonal neighbors.

TABLE 2 illustrates the weight factors of a 3×3 spatial filter used for blending of the border foreground pixels. This filter operates in a manner similar to the Gaussian blur filter previously described, but is applied only to foreground pixels that are proximate a border or edge between the background and foreground portions of the frame.

TABLE 2

A 3 × 3 smoothing filter kernel used for foreground edge blending

| $3/58$ | $6/58$ | $3/58$ |
| $6/58$ | $22/58$ | $6/58$ |
| $3/58$ | $6/58$ | $3/58$ |

In order to separate the background and foreground portions for appropriate application of the above-described anti-aliasing and smoothing filters, an image graphics processor is illustratively programed to compare the color value of each pixel in each video frame to the color value of the corresponding pixel in a stored background image. It should be noted that the stored background image may need to be updated periodically, for example, responsive to changes in lighting conditions. Based on the comparison, a determination is made as to whether the pixel is a background pixel, a pure foreground pixel, or a border foreground pixel. The appropriate filter is then used to update the pixel value for the background and border foreground pixels, with the pure foreground pixels remaining unchanged.

It is to be appreciated that the particular filter types and configurations given above, as well as the particular techniques for separating background and foreground portions of an image, are examples only, and numerous alternative filters or other image processing techniques can be used in other embodiments.

Additional features that may be implemented individually or collectively in embodiments of the invention will now be described. Although these additional features are described in certain instances primarily as methods, it will be apparent to those skilled in the art that the corresponding features can be implemented in other forms, including apparatus, systems, processing devices, integrated circuits, and computer-readable storage media having computer program code embodied therein. It is assumed that these features are implemented in the content delivery system 100 of FIG. 1, although such features can be implemented individually or in various combinations in other types of content delivery systems.

One of the additional features is a "Follow Me" directing feature that allows one user to choose to watch what another user is watching.

In a traditional television production, there is a special role for a director, who decides when to change camera angles, when to show replays, etc. Here, a method is described for allowing any user of a multi-channel system to become a director for other users. In it, a "viewer" (the following user) subscribes to a "director" (simply another user), and then views the video as the director user does, seeing the same camera view changes, replays, stats overlays and anything else the director views.

The method starts with a user selecting a director to follow from an available list. In order to ensure privacy, this viewer can potentially block his own view so others cannot follow him thus making him a director. Once the director is selected from the available list, the viewer's client application is sent a sequence of events (e.g., change camera, replay, open stats, etc.) corresponding to the actions the director takes in his user interface, which are then mirrored on the viewer's client application. However, the delay for the director to select an item in the user interface and send a message to the viewer should be accommodated, or else the channel changes could occur at the wrong times. To do this, the system estimates that delay via actual measurements. Then, when a user becomes a viewer of a selected director, the viewer's video streams are delayed by this amount to synchronize the video and director events.

Another exemplary feature provides user-generated audio commentary within a given content stream. For example, this feature can be used to generate a push-to-talk like social experience in the client application.

Accordingly, commentators or users can send live audio from the web or a mobile device. Other users can then select an alternate audio stream in place of the broadcast audio. The user is presented with a list of alternate audio sources. The user simply picks from the list. The user can choose a different audio source at any time including switching back to the standard broadcast audio.

Alternatively, rather than subscribing to a specific audio track, each user could publish segments of audio to a group to create a shared audio track.

Other embodiments can incorporate a moving telestration feature. The telestration feature allows users to draw on the video so that other users viewing the video can see it. However, in a moving video, those drawings can quickly get out of sync with respect to the video. Instead, in one possible implementation, the user "pins" a drawing to one or more objects in the video, so that the drawing follows the object visually. This allows the user to circle an object, draw an arrow to an object, label it with a name, etc. in a way that remains consistent if either the object or the camera moves.

The method for this feature illustratively comprises a preparation phase, a drawing phase, and a rendering phase. These phases can occur at substantially the same time in the case of a live event.

The preparation phase involves identifying a set of reference points in the image, tracking their movements from frame to frame and storing the locations of the reference points with each frame. There are multiple ways of implementing this. One method is object detection/tracking Here an object detector+tracker is run (e.g., the tracker used in the player identification algorithm chain described above). This generates well-behaved movement (i.e., it follows the person), but only for restricted classes of objects such as players which have been positively identified. Another method that can be used is flow/motion tracking. This starts by initially populating the view with reference points spaced on a grid. For each frame, run optical flow (e.g., computing the motion vectors of the video from one frame to the next), and move the reference points accordingly. This creates an effect similar to tracking an "object" at each location in the initial frame, though with potentially more errors (as the object is not necessarily well defined). As reference points collide or move offscreen, new reference points are added to keep the total in balance.

In the drawing phase, the user combines a drawing gesture with an implicit or explicit selection of a reference point or points. For example, if the user draws a circle, then the set of reference points inside the circle can be used by default. Another method to get the reference point is that before or after drawing, the user can point to a spot in the image and the nearest reference point to that location is selected. In subsequent frames, the location and scale of the drawing is adjusted. The location of the drawing (a circle in this example) is computed to have the same offset from the target reference point in the new image that the original had to the reference point in the original image. Size is adjusted by using multiple reference points, and comparing the distances between them in the new and original images.

In the rendering phase, when other users view the video, the image is drawn so that its distance to the reference points is minimized thus keeping the drawing (a circle here) in the same relative location even though objects are in motion.

Another feature that may be implemented in a content delivery system in one or more embodiments relates to what is referred to herein as "gamification." This feature illustratively involves overlaying or otherwise integrating a video game over a live sports event, for example, as a combination of a live event, telestration and a game. In some embodiments, a method is provided for allowing users to play games by directly interacting with the video during the event. This is particularly useful in cases where the outcome of the game is not meaningful, for example, where the team cannot make the playoffs late in the season or the game is a runaway with little chance for the outcome to change. The effect is to encourage viewership and participation even for these non-critical games.

The method illustratively comprises both video analysis and user interaction. The video analysis involves identifying objects including player locations and specific court locations in the video. There are multiple ways that user interaction could be implemented and a few examples are described in the following paragraphs.

One user interaction method allows users to mark areas, such as points and lines for instance. The system then tracks whenever a game event happens that impinges on one of those marks, for example, if a player shoots from this location on the court, or if the player with the ball crosses a line drawn on the court (simulating a defensive play by the user). This example uses basketball, but similar techniques could be implemented for many other sports.

Another embodiment of user interaction is possible where the user tries to predict what will happen and gets points based on the accuracy of the prediction. Here again basketball is used as an example. The user could predict which team will score next, which player will score next and if it will be a 1, 2 or 3 point shot. The user is awarded 1 point if the team is right, 2 points if the player is right and 3 points if the score is right. The user could compete with a group of friends in this game. The predictions could be made in advance or when the game is in progress depending on the implementation. Telestration and texting could be used to keep track of the score or share comments with other game players during the game.

Animation can also be used with gamification. Animated characters could be imposed on the actual video to highlight user game choices. For instance the user could associate an animated image with a player and the animation could be imposed over the actual face of the player. In some cases there could be an animated player to represent the video game player. For instance in a golf game the viewer could become a player and be represented by an animated figure and play along with the other players with an appropriate handicap.

Another feature included in a given embodiment relates to selecting, editing and sharing via social media. This feature allows, for example, selecting, editing, and sharing video clips of a sports event in real time via social media.

The user is provided with a tool that allows the arbitrary selection of the beginning time and ending time of a video clip from the game. An example of a user interface providing such a tool is shown in the display screen 600 of FIG. 6. Here the user selects the camera view desired and the starting and ending time.

Figure 7:
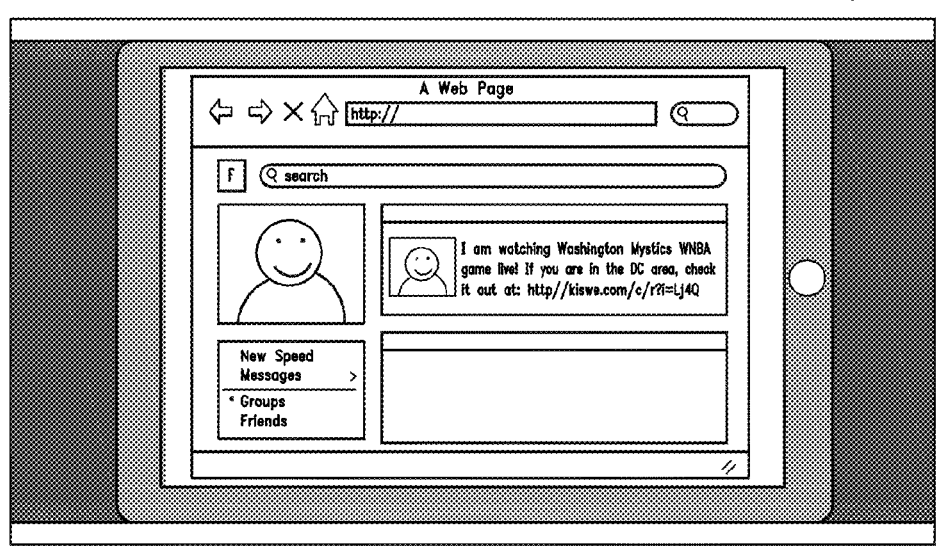
FIG. 7 illustrates sharing a video clip using social media.
Figure 8:
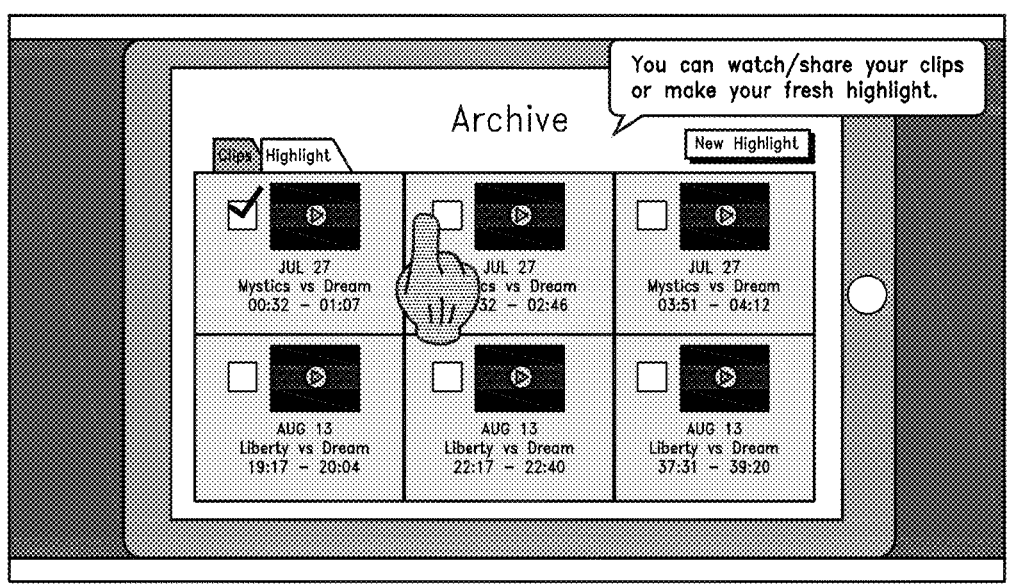
FIG. 8 illustrates selecting and sharing a video clip from a personal archive.

Once a clip has been selected, the clip can be shared via social media or email as shown in the display screen 700 of FIG. 7. The user can add comments and texts to explain why the clip was selected and provide any additional input.

A social interaction feature can additionally or alternatively be provided in some embodiments. This feature can allow a user to see what others are watching or what is most liked, and may provide an option to watch the most popular stream(s).

More particularly, this feature in some embodiments allows the user to pick the most popular content, not just selecting among recorded objects, but within a real time context. As an example, viewers could select the camera view that the most people are currently viewing. Another example allows the users to rate their viewing experiences. Another user could review the ratings and based on the ratings decide what to watch, or the system could select new pieces of content (e.g., including replays, commercials, camera angles, etc.) based on that data.

Yet another feature that can be provided is a user highlights channel. This feature illustratively provides a channel that shows the most replayed scenes.

More particularly, this feature in some embodiments allows a user to select a channel that shows the most viewed replays. This could run in a loop and show as an example the 10 most requested replays of the game. The list is updated as the event proceeds. The user can always go to a live feed when done with the replays or keep watching as the replay list is dynamically updated.

A further feature implemented in one or more embodiments permits navigating in the video. This feature allows the user to pick any zoomed view by navigating a visual representation. The user is presented with a mini-map of the entire available view, so the user can see other views and select if desired. This is helpful since the user's current view is often only a subset of the available views and therefore does not show all of the choices.

Once the user picks a zoom point the video switches to this point allowing the user to highlight a particular player or physical area, such as a bench camera view or a basket camera view. This could represent either a view of that area, or the view of what is visible from that location. The viewer can continue to select new zooms or go to another view such as the standard set of views or director views.

Another feature provides a personal archive of video clips. This feature provides the user with an ability to create a personal archive of video clips. For example, the user is presented with a graphical tool to select the start and end times of a video clip via the display screen 600 of FIG. 6. The user can provide a unique name to identify the saved video clip and store it to a personal archive as illustrated in the display screen 800 of FIG. 8. The stored clips can be played individually or in a round robin sequence for the user to review the saved highlights. They can be posted to social media or shared via email via the display screen 700 of FIG. 7, or downloaded for personal use.

Another feature is a metadata player. In accordance with this feature, metadata such as the game score, player stats and other relevant information is embedded into the video stream. The client software extracts this data from the video stream. The information is formatted and presented to the user via a transparent overlay of the video. This is done using the web browser running JavaScript as described above in conjunction with the client architecture of FIG. 2.

It is also possible for a content delivery system to be configured to support metadata synchronization. For example, metadata can be inserted in the video stream to allow synchronization between the video source and the client application. As an example, a "go live" signal can be embedded in the video stream so the client knows when the actual event is starting. The video stream may be embedded with this information in the encoder 104 in the system 100 of FIG. 1. The client can monitor the data stream for the go live signal. When the go live signal is received the client sends the video to the video player for the user to enjoy. This results in accurate event starts.

Another feature of some embodiments is gambling functionality. Such gambling functionality can be implemented in the client application, providing the user with a new dimension of entertainment. For example, the user can be provided with options to bet on the outcome of a game or outcome of particular plays, the number of points a player will score and any other possible outcome. A user interface is provided that allows the user to enter the bet. Payment is collected via the user interface using any number of available payment methods. Once the event is completed, the bettor either forfeits the bet or collects the winnings.

It should once again be noted that the above-described arrangements are exemplary only, and alternative arrangements can be used in other embodiments.

For example, the disclosed techniques can provide significant advantages in numerous content delivery contexts other than live video broadcast.

In addition, although some embodiments of the invention are configured to utilize streaming techniques that are based at least in part on the above-noted Apple HLS protocol or MSS protocol, it is to be appreciated that other embodiments can be configured utilizing a wide variety of other types of streaming protocols and accordingly are not limited to use with live streaming or HTTP.

Moreover, embodiments of the invention can be implemented using any type of mobile device or more generally any other type of client device, including, for example, desktop, laptop or tablet personal computers, smart televisions, smart watches, gaming systems and other processing devices.

A given client, server or other component in the FIG. 1 system is configured utilizing a corresponding processing device comprising a processor coupled to a memory. The processor executes software code stored in the memory in order to control the performance of processing operations and other functionality. The processing device also comprises a network interface that supports communication over one or more networks.

The processor may comprise, for example, a microprocessor such as the MPU noted above, an application-specific integrated circuit (ASIC), a field-programmable gate array (FPGA), a central processing unit (CPU), an arithmetic logic unit (ALU), a digital signal processor (DSP), or other similar processing device component, as well as other types and arrangements of processing circuitry, in any combination.

The memory stores software code for execution by the processor in implementing portions of the functionality of the processing device. A given such memory that stores software code for execution by a corresponding processor is an example of what is more generally referred to herein as a computer-readable storage medium having computer program code embodied therein, and may comprise, for example, electronic memory such as SRAM, DRAM or other types of random access memory, read-only memory (ROM), magnetic memory, optical memory, or other types of storage devices in any combination.

Articles of manufacture comprising such computer-readable storage media are considered embodiments of the invention. The term "article of manufacture" as used herein should be understood to exclude transitory, propagating signals.

In addition, embodiments of the invention may be implemented in the form of integrated circuits comprising processing circuitry configured to implement processing operations associated with content delivery. For example, an embodiment of the invention may be in the form of an integrated circuit comprising an image graphics processor.

The particular configurations of content delivery systems described herein are exemplary only, and a given such system in other embodiments may include other elements in addition to or in place of those specifically shown, including one or more elements of a type commonly found in a conventional implementation of such a system.

For example, in some embodiments, a content delivery system may be configured to utilize the disclosed techniques to provide alternative functionality. The disclosed techniques can be similarly adapted for use in a wide variety of other types of content delivery systems.

It is also to be appreciated that the particular process steps used in the embodiments described above are exemplary only, and other embodiments can utilize different types and arrangements of processing operations.

It should again be emphasized that the embodiments of the invention as described herein are intended to be illustrative only. Other embodiments of the invention can be implemented utilizing a wide variety of different types and arrangements of content delivery systems, networks, devices, client and server configurations, and streaming arrangements than those utilized in the particular embodiments described herein. Also, a wide variety of different combinations of content interaction features can be provided in respective embodiments. In addition, the particular assumptions made herein in the context of describing certain embodiments need not apply in other embodiments. These and numerous other alternative embodiments within the scope of the following claims will be readily apparent to those skilled in the art.

What is claimed is:

1. A method comprising:
receiving content from at least one source;
processing the content to identify an object in the content;
assigning an identifier to the object based on the processing;
permitting viewer selection of the object identifier; and
providing additional information for presentation to a viewer of the content responsive to viewer selection of the object identifier;
wherein the content comprises at least a portion of a panoramic video comprising a combination of multiple live videos from respective ones of a plurality of video sources;
the method further comprising digitally cropping and scaling the panoramic video before providing a resulting version of the content for presentation to the viewer;
wherein the receiving, processing, assigning, permitting and providing are implemented in at least one processing device comprising a processor coupled to a memory;
wherein said at least one processing device is further configured to generate a plurality of different digitally cropped and scaled versions of the content from the panoramic video; and
wherein said at least one processing device is further configured to provide a first one of the plurality of different digitally cropped and scaled versions of the content for presentation to the viewer, and responsive to input from the viewer, to provide a second one of the plurality of different digitally cropped and scaled versions of the content for presentation to the viewer, wherein the second one of the plurality of different digitally cropped and scaled versions of the content is provided for presentation from a rewind point specified by the viewer.

2. The method of claim 1 wherein the content comprises live video from at least one live video source.

3. The method of claim 1 further comprising generating a plurality of different digitally cropped and scaled versions of the content from the panoramic video.

4. The method of claim 3 further comprising:
providing a first one of the plurality of different digitally cropped and scaled versions of the content for presentation to the viewer; and
responsive to input from the viewer, providing a second one of the plurality of different digitally cropped and scaled versions of the content for presentation to the viewer;
wherein the second one of the plurality of different digitally cropped and scaled versions of the content is provided for presentation from a rewind point specified by the viewer.

5. The method of claim 1 wherein assigning an identifier to the object comprises assigning a player identifier to the object.

6. The method of claim 5 wherein providing additional information comprises providing the viewer with social media information associated with the player identifier.

7. The method of claim 5 wherein providing additional information comprises providing the viewer with a particular camera view associated with the object identifier.

8. The method of claim 7 wherein the particular camera view comprises a tracked player view in which a player corresponding to the player identifier is tracked over a plurality of frames and the camera view is cropped and scaled to increase an apparent size of the player in the tracked player view.

9. The method of claim 1 wherein the processing and assigning comprise:
obtaining image coordinates for the object in each of a plurality of frames;
determining a trajectory for the object over the frames based at least in part on the obtained image coordinates;
classifying the object in each of at least a subset of the frames based at least in part on the trajectory; and
assigning a player identifier to the classified object.

10. The method of claim 9 wherein obtaining image coordinates for the object in a given one of the frames comprises performing color blob detection based at least in part on a known team uniform color of one or more players.

11. The method of claim 1 wherein assigning an identifier to the object comprises:
receiving input from the viewer associating the identified object with a particular player; and
assigning a player identifier of the particular player to the identified object based at least in part on the received input.

12. A method comprising:
receiving content from at least one source;
processing the content to identify an object in the content;
assigning an identifier to the object based on the processing;
permitting viewer selection of the object identifier; and
providing additional information for presentation to a viewer of the content responsive to viewer selection of the object identifier;
wherein the receiving, processing, assigning, permitting and providing are implemented in at least one processing device comprising a processor coupled to a memory;
wherein the processing and assigning comprise:
obtaining image coordinates for the object in each of a plurality of frames;
determining a trajectory for the object over the frames based at least in part on the obtained image coordinates;
classifying the object in each of at least a subset of the frames based at least in part on the trajectory; and assigning a player identifier to the classified object; and
wherein classifying the object comprises:
defining an area of a given one of the frames using the obtained image coordinates for that frame;
generating descriptors for the defined area using a dense feature set;
applying the descriptors to a Gaussian mixture model to generate Fisher vectors;
pooling the descriptors and associated Fisher vectors to form a spatial pyramid; and
utilizing the spatial pyramid to classify the object within the given frame as corresponding to the player identifier.

13. A method comprising:
receiving content from at least one source;
processing the content to identify an object in the content;
assigning an identifier to the object based on the processing;
permitting viewer selection of the object identifier; and
providing additional information for presentation to a viewer of the content responsive to viewer selection of the object identifier;
wherein the receiving, processing, assigning, permitting and providing are implemented in at least one processing device comprising a processor coupled to a memory;
wherein the processing and assigning comprise:
detecting a preassigned player indicator on a uniform of a player corresponding to an identified object;
assigning a player identifier to the identified object based at least in part on the detected preassigned player indicator; and
processing the content to substantially remove the preassigned player indicator from the content before providing the content for presentation to the viewer.

14. A method comprising:
receiving content from at least one source;
processing the content to identify an object in the content;
assigning an identifier to the object based on the processing;
permitting viewer selection of the object identifier; and
providing additional information for presentation to a viewer of the content responsive to viewer selection of the object identifier;
wherein the receiving, processing, assigning, permitting and providing are implemented in at least one processing device comprising a processor coupled to a memory;
the method further comprising:
identifying players in the content;
separating the content into a first portion comprising image portions associated with the players and a second portion comprising image portions associated with background;
applying an anti-aliasing process to the second portion; and
recombining the first and second portions;
wherein the recombined first and second portions are provided for presentation to the viewer.

15. The method of claim 14 further comprising altering one or more advertisements of the second portion prior to recombining the first and second portions.

16. An article of manufacture comprising a non-transitory computer-readable storage medium having computer program code embodied therein, wherein the computer program code when executed in at least one processing device causes said at least one processing device:
to receive content from at least one source;
to process the content to identify an object in the content;
to assign an identifier to the object based on the processing;
to permit viewer selection of the object identifier; and
to provide additional information for presentation to a viewer of the content responsive to viewer selection of the object identifier;
wherein the content comprises at least a portion of a panoramic video comprising a combination of multiple live videos from respective ones of a plurality of video sources;
wherein the computer program code when executed in said at least one processing device further causes said at least one processing device to digitally crop and scale the panoramic video before providing a resulting version of the content for presentation to the viewer;
wherein said at least one processing device is further configured to generate a plurality of different digitally cropped and scaled versions of the content from the panoramic video; and
wherein said at least one processing device is further configured to provide a first one of the plurality of different digitally cropped and scaled versions of the content for presentation to the viewer, and responsive to input from the viewer, to provide a second one of the plurality of different digitally cropped and scaled versions of the content for presentation to the viewer, wherein the second one of the plurality of different digitally cropped and scaled versions of the content is provided for presentation from a rewind point specified by the viewer.

17. An apparatus comprising:
at least one processing device comprising a processor coupled to a memory;
wherein said at least one processing device is configured to receive content from at least one source, to process the content to identify an object in the content, to assign an identifier to the object based on the processing, to permit viewer selection of the object identifier, and to provide additional information for presentation to a viewer of the content responsive to viewer selection of the object identifier;
wherein the content comprises at least a portion of a panoramic video comprising a combination of multiple live videos from respective ones of a plurality of video sources;
wherein said at least one processing device is further configured to digitally crop and scale the panoramic video before providing a resulting version of the content for presentation to the viewer;
wherein said at least one processing device is further configured to generate a plurality of different digitally cropped and scaled versions of the content from the panoramic video; and
wherein said at least one processing device is further configured to provide a first one of the plurality of different digitally cropped and scaled versions of the content for presentation to the viewer, and responsive to input from the viewer, to provide a second one of the plurality of different digitally cropped and scaled versions of the content for presentation to the viewer, wherein the second one of the plurality of different digitally cropped and scaled versions of the content is provided for presentation from a rewind point specified by the viewer.

18. The apparatus of claim 17 wherein said at least one processing device comprises at least one server.

19. A content delivery system comprising the apparatus of claim 17.

20. The apparatus of claim 17 wherein the multiple live videos correspond to respective multiple live video feeds provided by respective ones of a plurality of fixed view ultra-high resolution video cameras and wherein the panoramic video is generated by stitching together the multiple live video feeds from the respective ones of the plurality of fixed view ultra-high resolution video cameras so as to thereby combine the multiple live video feeds into a single panoramic view.

\* \* \* \* \*